Figure 1:
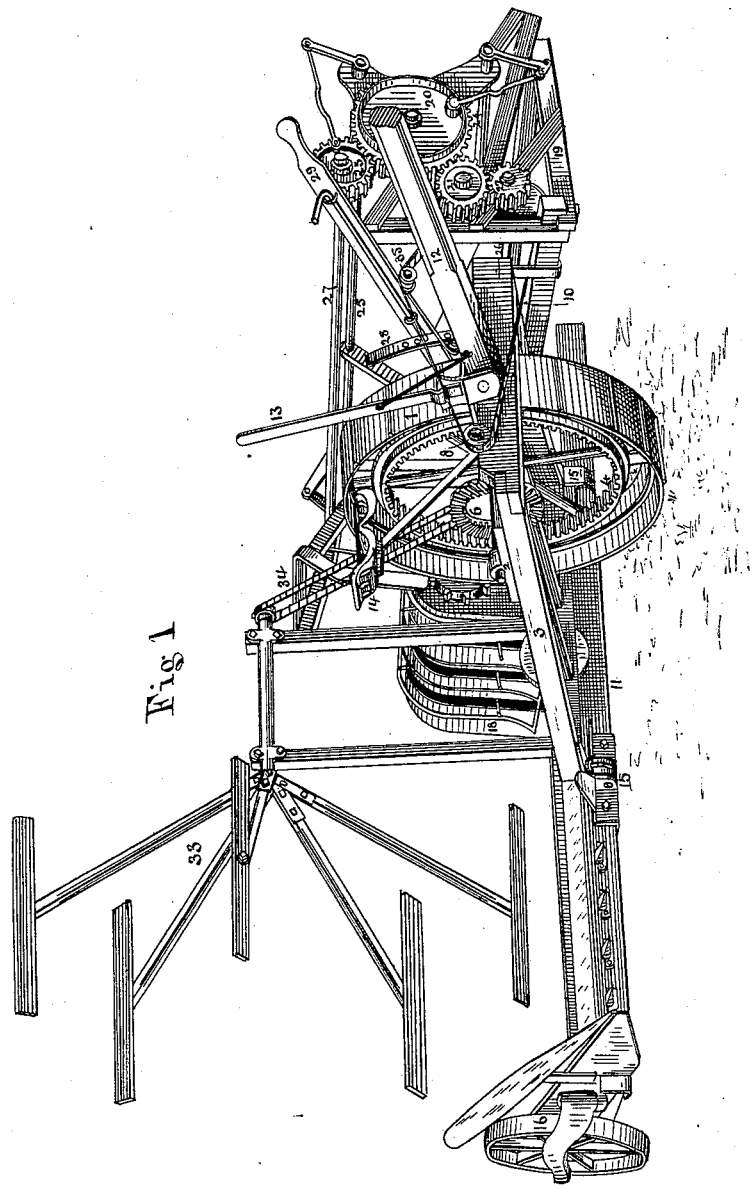

(No Model.) 4 Sheets—Sheet 1.
W. N. WHITELEY & W. BAYLEY.
HARVESTER AND BINDER.

No. 337,220. Patented Mar. 2, 1886.

Witnesses. Inventor.

(No Model.) 4 Sheets—Sheet 2.
W. N. WHITELEY & W. BAYLEY.
HARVESTER AND BINDER.
No. 337,220. Patented Mar. 2, 1886.
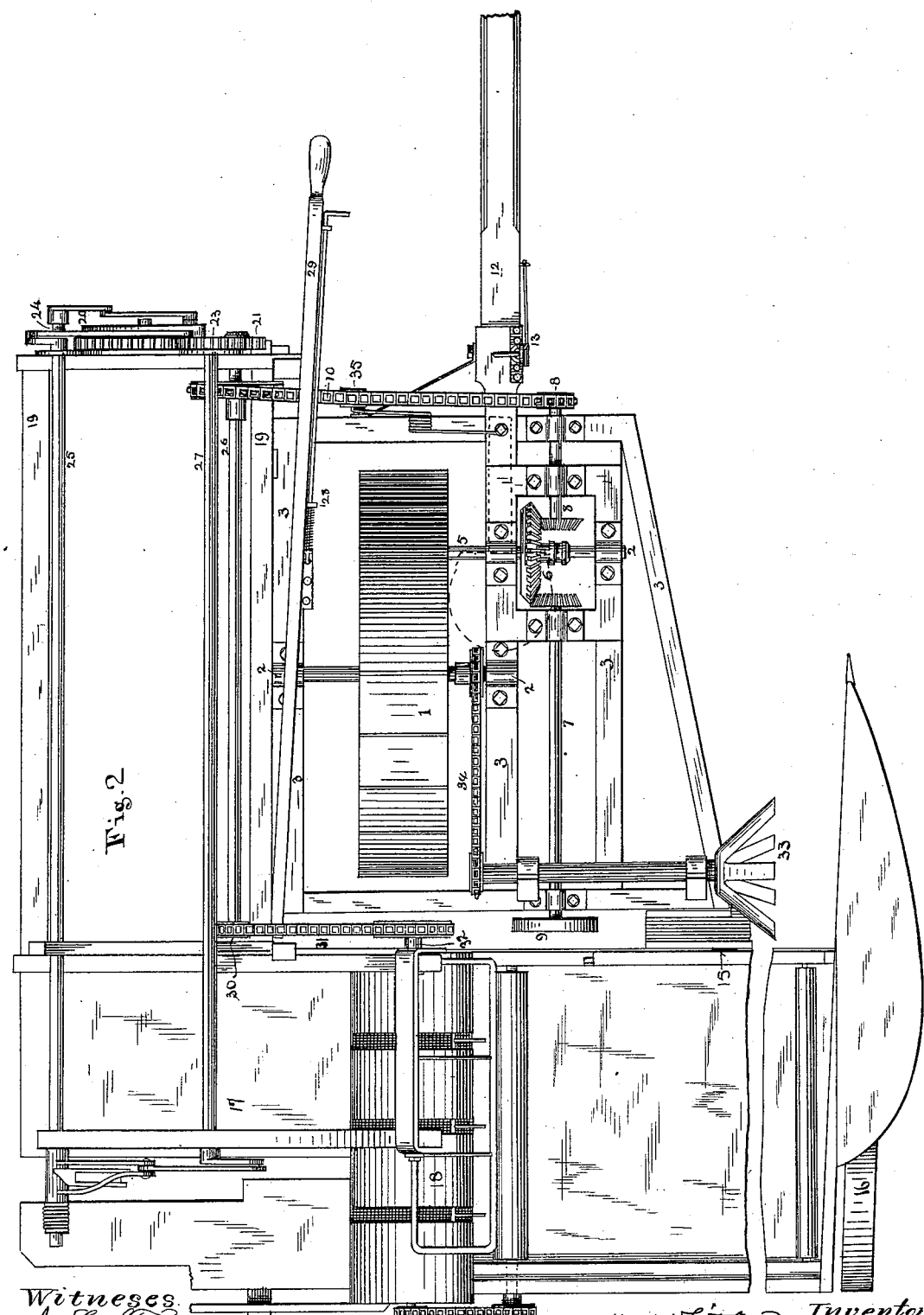

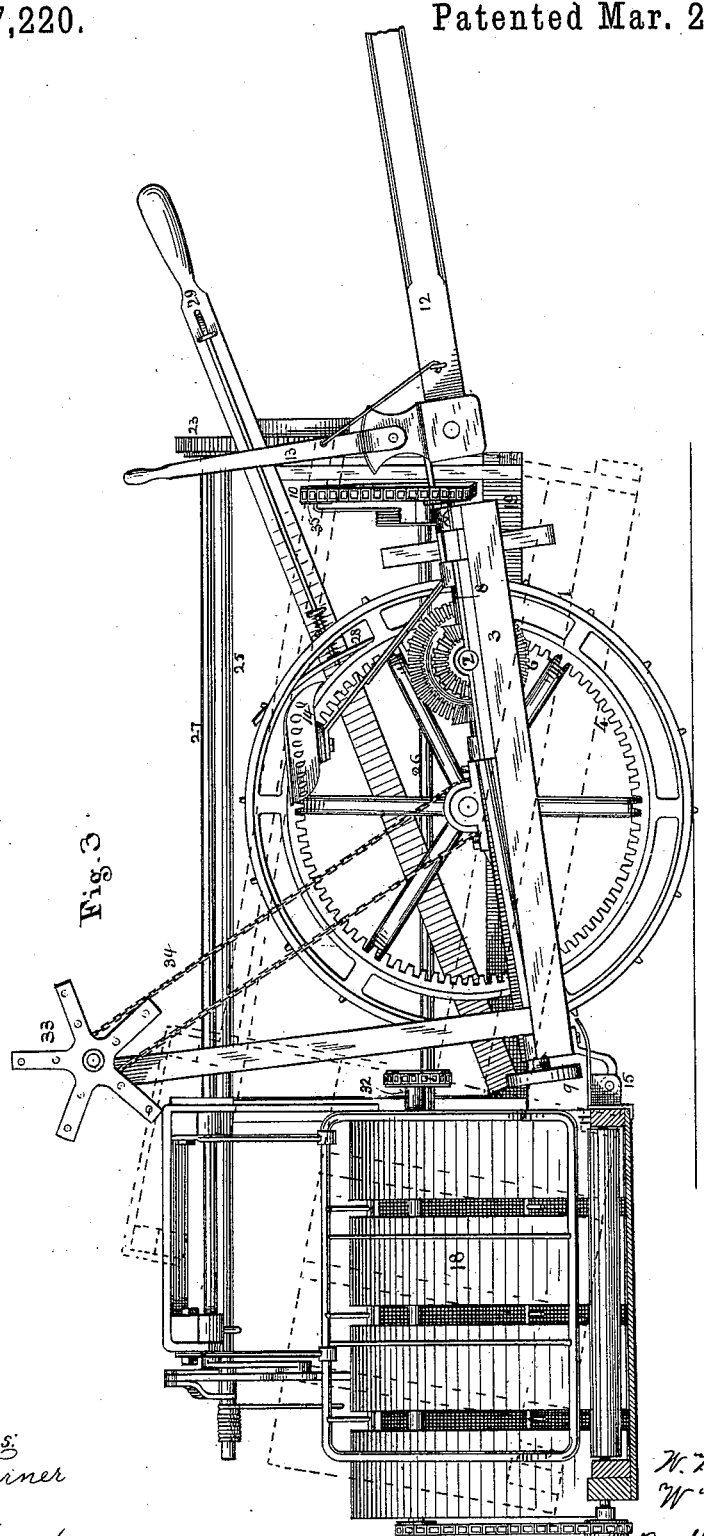

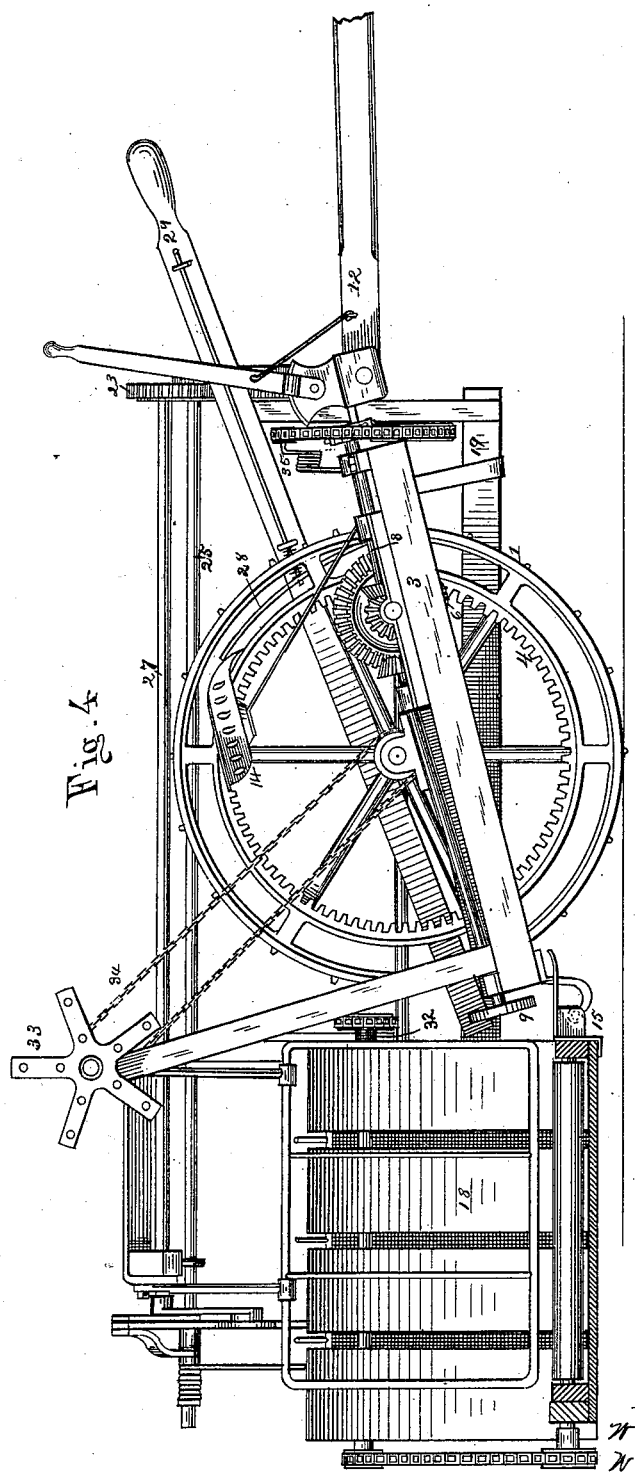

UNITED STATES PATENT OFFICE.

WILLIAM N. WHITELEY AND WILLIAM BAYLEY, OF SPRINGFIELD, OHIO; SAID BAYLEY ASSIGNOR TO SAID WHITELEY.

HARVESTER AND BINDER.

SPECIFICATION forming part of Letters Patent No. 337,220, dated March 2, 1886.

Application filed April 17, 1884. Serial No. 128,301. (No model.)

*To all whom it may concern:*

Be it known that we, WILLIAM N. WHITELEY and WILLIAM BAYLEY, of Springfield, in the county of Clark and State of Ohio, have invented new and useful Improvements in Harvesters and Binders; and we do hereby declare that the following is a full and accurate description of the same, reference being had to the accompanying drawings, in which—

Figure 1 is a front perspective view of our machine in operative condition. Fig. 2 is a plan of the same. Fig. 3 is a grain side elevation of the same, the cutting apparatus and conveyer being in vertical transverse section. Fig. 4 is an inner side elevation of our machine, the cutting apparatus being in section, the cutting apparatus and binder being closer to the ground than as shown in Fig. 3.

The principal point of our invention is in a cutting apparatus, grain-carrier, and automatic binder, supported upon a frame transverse to and in rear of the main drive-wheel, said frame being hinged to a main wheel-frame, and the binder-gearing being all in advance of the hinge between said main wheel-frame and grain-receiving elevator and binder-frame, whereby the weight of the binder mechanism and grain-carrier is counterbalanced on the line of said hinge by the weight of the gearing.

Other novel features will be particularly explained and claimed.

1 is a main supporting and driving wheel turning in axial boxes 2, fixed on a main wheel-frame, 3. The main wheel 1 is provided with a gear-ring, 4, whereby motion is transmitted to the pinion-shaft 5, and by means of the bevel-wheel 6 said motion is transmitted to counter-shafts 7 and 8, and thereby, respectively, to the cutter-driving crank 9, and by the chain-belt 10 and driving-gearing to the grain carrier and binder. The main wheel-frame 3 being jointed to the grain-carrier and binder-frame 11, the height at which the latter is carried from the ground is regulated by the position of said main frame 3, and the tongue 12 is therefore hinged to the front end of the frame 3, and a lever, 13, with rack and latch, whereby the driver, while sitting on his seat 14, can by rocking the frame on the drive-wheel axle change the elevation of the cutting apparatus, which is attached to frame 11, from the ground at will. The frame 11, which supports the cutting apparatus, grain-conveyer, and binder mechanism, is hinged to the main wheel-frame 3, so that the angular position of the cutters and guard-fingers as to the ground may be changed as required by tilting the frame on the hinge 15 to adapt them to the condition of the grain or to the distance the cutters are carried from the ground.

The various reasons for the several adjustments of these parts are well understood, and need not be explained at greater length here.

In all machines before our invention, however, so far as we know, where the grain-carrier and binding mechanisms have been carried on a frame separate from the main wheel-frame and hinged thereto, the weight of the gearing has been on one side of the joint with the binding mechanism, and not on the opposite side, to counterbalance the binder on said joint. So far as we know, also, no machine made before our invention hereof had the binder and grain-carrier on a frame in rear of the main wheel, with the gearing arranged in front of the axis of the main wheel, so as not only to counterbalance the weight of the binder upon the hinge-joint between the grain-carrier and binder-frame and the main wheel-frame, but also to counterbalance the binder, &c., upon the axis of the main wheel 1. The hinge-joint between the frames 11 and 3 is shown at 15. The cutting apparatus is the usual kind, and the outer end of the frame 11 is carried on a grain-wheel, 16.

In the drawings hereto attached the deck or platform 17, on which the grain is delivered for binding, is somewhat elevated above the plane of the grain-carrier, and the grain is carried thereto by a vertical elevator, 18; but such elevation of the binder-platform is not essential.

A frame, 19, is mounted upon the frame 11, across its stubble side and projects therefrom forward parallel to the plane of the wheel and to a point in advance of the hinge 15, and preferably in advance of the periphery of the wheel 1, so that the weight of the frame and the gearing mounted thereon shall counterbalance the weight of the frame 11 and the mechanism carried thereon upon the hinge 15 as a fulcrum. The frame 19 is rigidly secured to the frame 11, and forms an integral part thereof. At the front end of the frame 19 there are suitable bearings for the members of the gear-train 20 21 22 23, which go to make up the operative mechanism of the binder and grain-carrier. These gears and operative devices transmit their motions to the binding devices by means of the shafts 24 25 26 27, &c., which extend back to said devices. Motion is transmitted by chain 10 from counter-shaft 8 to the driving sprocket-wheel on shaft 26; but we do not desire to confine ourselves to this mode nor arrangements of parts for transmitting the motion of the main wheel to the binding devices.

35 is an idler-pulley to take up the slack of the chain 10 and maintain it in proper working tension.

28 is a rack-standard mounted on the frame 3, and 29 is a lever mounted on the frame 19 and provided with a latch to engage said standard 28. By means of this lever the frames 11 and 19, with the mechanisms they carry, may be tilted and rocked upon the hinge 15 and locked in position.

It is evident that the mechanical structure and arrangement of parts as well as the materials of the frames and gearing herein shown may be varied without in any sense changing the principle of our invention as set forth above. We therefore do not enter into a minute description of the several parts.

The binding devices may be of any approved kind, and the actuating devices may likewise be of any approved design. The shaft 26 has near its rear end a sprocket-wheel, 30, over which a chain, 31, passes to drive the elevator-shaft 32, and therefore the changes of angular position of the frame 11 and the main frame do not affect the driving motion of the elevator. The reel 33 is mounted upon a post or frame, and is driven by a chain, 34, from the shaft of the master-wheel.

Having described our invention, we claim—

1. In a rear-cut grain-binding harvester, the combination of the main wheel-frame supported by the main driving-wheel, gearing extending direct therefrom to the cutting apparatus, which is supported on a frame hinged to said main wheel-frame on the line of the cutters, suitable binding mechanism rigidly connected to the frame supporting the cutting apparatus and located in rear of the hinge, and suitable gearing for driving said binding mechanism mounted upon the same frame, but located in advance of the axle of the main driving-wheel for the purpose of balancing the frame carrying the binder and grain-carrier on the hinge between said frame and the wheel-frame.

2. In a rear-cut grain-binding harvester, the combination of the main wheel-frame supported by the main driving-wheel, direct gearing therefrom located on the stubble side of and in advance of the center of said main driving-wheel, and suitable binding mechanism mounted on a separate frame located on the stubble side and in rear of said main wheel-frame and the center of the main driving-wheel for the purpose of balancing and operating the machine, as set forth.

3. In a grain-binding harvester, the cutting apparatus, grain-carrier and binder mechanism located in rear of the main driving-wheel, and a counter-shaft driven mediately by said wheel, extending to a point in front thereof, in combination with suitable mechanism for driving the carrier and binder located in front of the periphery of the main wheel on its outside, and suitable means for communicating motion from the said counter-shaft to binder-driving mechanism located on the outer side of the wheel.

4. In a rear-cut grain-binding harvester having the frame carrying the cutting apparatus hinged to the main wheel-frame on the line of cut, the combination of the binding mechanism located in rear of said hinge, and the gearing for driving the binding devices located on an extension of said frame in front of said hinge, the extension and gearing being advanced forward by the side of the main wheel to counterbalance the weight of the binding mechanism and frame upon said hinge, as set forth.

5. In a rear-cut grain-binding harvester, the combination of a main wheel-frame supported by the main driving-wheel, a hinged tongue controlled by a lever attachment to the main wheel-frame, a frame supporting the cutting apparatus hinged to said main driving-wheel frame and supporting also the binding mechanism in rear of and outside of the plane of said main driving-wheel, gearing for said binder located in front of the axis of the main wheel, and a controlling-lever for said hinged frame supporting the cutting apparatus and the binder with segment and latch, all arranged, substantially as set forth, for the purpose of better balancing, raising, lowering, and tilting the frame carrying the cutters and binder.

6. In a rear-cut grain-binding harvester, the tongue hinged to the front end of the main wheel-frame, and the frame supporting the cutting apparatus hinged to the rear end of said main wheel-frame, in combination with the gear driven by the master-wheel located upon said main wheel-frame on the stubble side of and in advance of the center of said main wheel, and the binder mechanism located outside of and in rear of said wheel, and suitable means for separately controlling said binding and cutting apparatus supporting-frame for the purpose of balancing and raising, lowering, and tilting the machine by the driver from his seat or stand.

WILLIAM N. WHITELEY.
WILLIAM BAYLEY.

Witnesses:
F. B. FURNISS,
L. PHILLIPS.